INVENTORS
Joseph Abruzzo, Andrew P. Cox, Jr.,
and Raymond F. Hollandbeck.

United States Patent Office 3,460,060
Patented Aug. 5, 1969

3,460,060
NAVIGATION SYSTEM
Joseph Abruzzo, Severna Park, Andrew P. Cox, Jr., Lutherville, and Raymond F. Hollandbeck, Ellicott City, Md., assignors to Westinghouse Electric Corporation, Pittsburgh, Pa., a corporation of Pennsylvania
Filed Aug. 15, 1966, Ser. No. 572,293
Int. Cl. H04b 13/00
U.S. Cl. 340—4
8 Claims

ABSTRACT OF THE DISCLOSURE

An undersea vehicle transmits an acoustic signal to two transponder stations separated by a known distance S. Return signals from the transponder stations initiate the transfer of the count in a running range counter to an onboard computing means which then computes a value for the contour parameter $Y/S$ where $Y/S$ is dependent upon $$\frac{R1^2 - R2^2}{S^2}$$

R1 and R2 are the respective ranges to the transponder stations and Y is a coordinate position. The computer means includes a control unit which eliminates the need for a stored program. The value of contour parameter is displayed and a navigational course is maintained by the vehicle by keeping the output reading of the contour parameter at a predetermined constant value.

---

This invention generally relates to the field of navigation, and particularly to a method and apparatus for practicing operations which are particularly desirable both for surface and subsurface vessels.

In underwater search or salvage operations, in addition to underwater scientific explorations, there is a need for a navigational system which will maintain the underwater vehicle in a strict navigation course or pattern. With the growing interest in undersea technology a large class of relatively small submersible vehicles has evolved and in such vehicles space is generally at a premium. Present systems for accurately maintaining a navigational course include inertial navigation systems in conjunction with highly complex and expensive computers. Although such systems are highly accurate they are not practical in many situations since the cost may be prohibitive, and the necessary space for such systems is not available. The need therefore still exists for an accurate navigational system which may find use not only in large surface or air vessels but is particularly well adapted for relatively small underwater vehicles.

It is therefore an object of the present invention to provide an improved highly accurate navigation system.

Another object is to provide a navigation system in which a strict search pattern may be accurately maintained.

A further object is to provide navigation apparatus which is highly reliable and will perform navigational computations without the need for a pre-programmed memory storage.

Still another object is to provide navigation apparatus which is compact, for environments where space may be at a premium.

A further object is to provide a new and improved navigational method.

Briefly in accordance with the above objects, the broad concept of the invention comprises means for obtaining the ranges from a navigational position such as occupied by an undersea vehicle, to first and second spaced points separated by a known distance S. The spaced points may be positioned and defined such as by radar or sonar reflecting targets or transponders. Means are provided for obtaining a value for the contour parameter $Y/S$ where Y is a coordinate position and $$\frac{Y}{S} = \frac{R1^2 - R2^2}{2S^2} + \frac{1}{2}$$

R1 and R2 are the respective distances from the vehicle to the spaced points and S is the distance between the points. The contour parameter $Y/S$ defines, for various ranges R1 and R2, a family of parallel planes perpendicular to the line joining the spaced points. An indicating means such as a meter is provided for giving an indication of the contour parameter value so that the vehicle pilot may maneuver the vehicle to maintain the meter reading at a predetermined constant value and with the reading at the predetermined constant value the vehicle describes a navigational course in a known one of the planes of the family of planes. By maneuvering the vehicle so that the reading provides a second predetermined value the pilot may navigate the vehicle in another plane of the family of planes.

The objects and the basic concept are accomplished in the present invention one illustrative embodiment of which comprises a control means for initiating a sequence of predetermined operations for controlling various logic, arithmetic and gating units. Means are provided for obtaining first and second range signals each respectively indicative of the range from the vehicle to the spaced points. The range signals are utilized to transfer the count in a running counter to a storage means whereby the count stored is indicative of the R1 and R2 ranges. The control means then initiates the predetermined arithmetic operation of squaring the ranges, subtracting them and dividing by a predetermined and stored constant to obtain a final value which is the $Y/S$ contour parameter, which is then displayed for use by the operator of the vehicle.

Where an automatic navigation system is desired various data may be inputted into the system which in conjunction with the contour parameter value may be utilized in various feedback and servo mechanism arrangements to control the vehicle propulsion system.

The above stated as well as further objects and advantages of the present invention will become apparent from a reading of the following detailed specification taken in conjunction with the drawings, in which.

Figure 4:
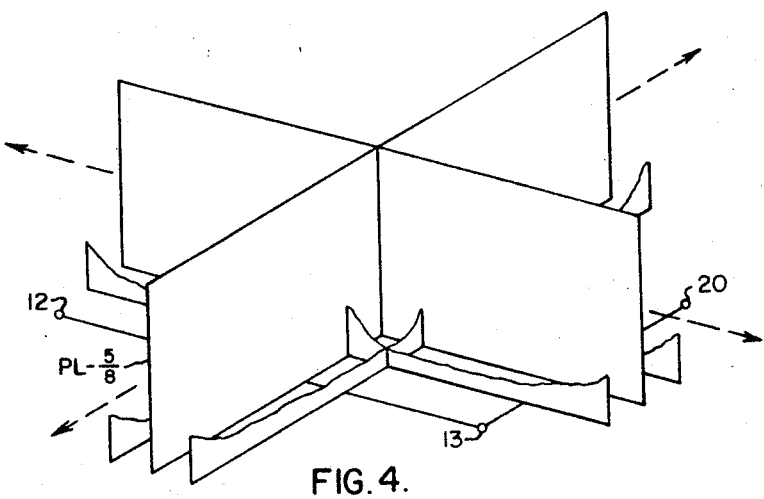
Figure 5:
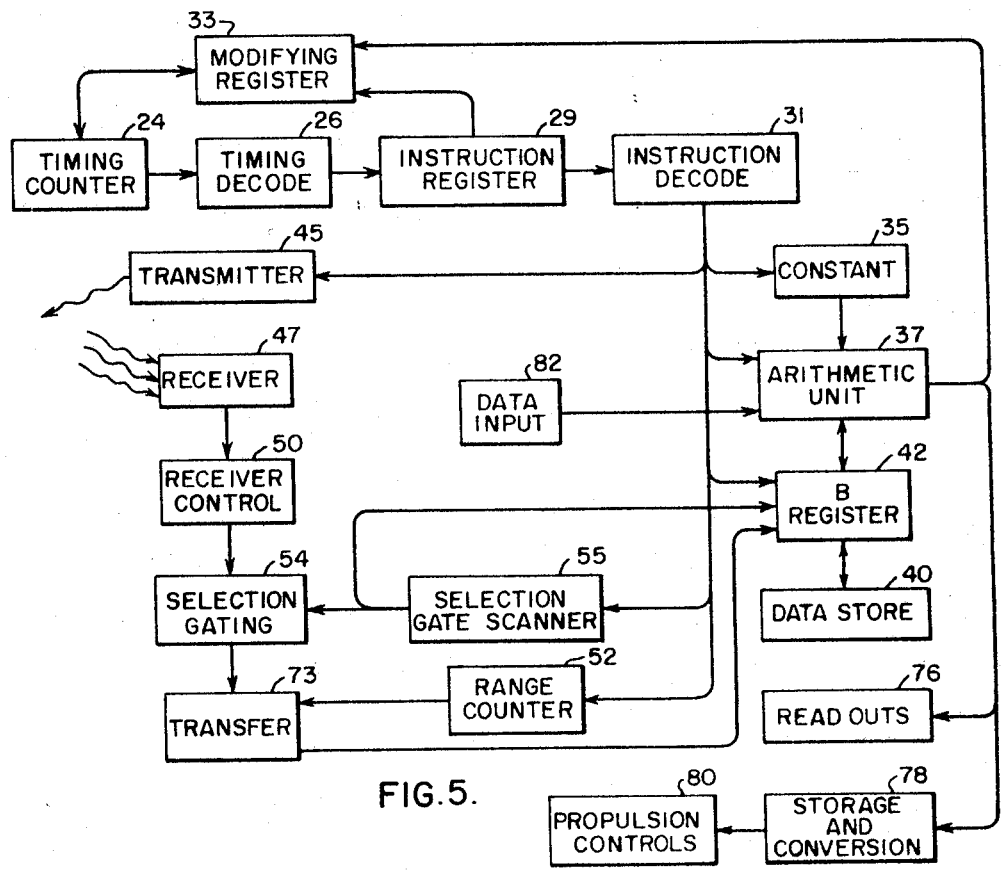
Figure 6:
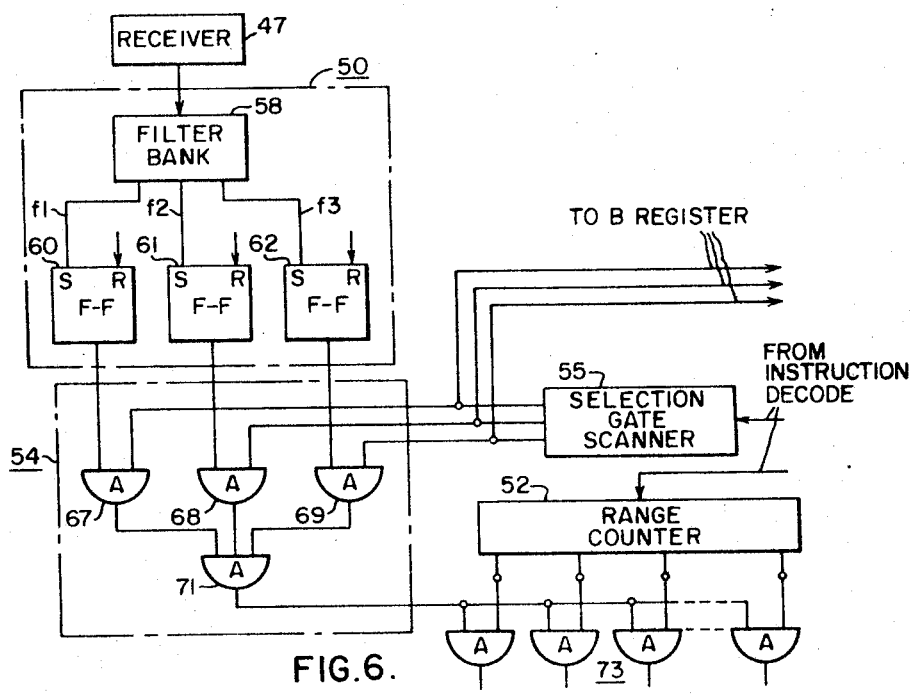

FIG. 4 serves to illustrate an intersecting plane arrangement of the present invention;

FIG. 5 illustrates, in block diagram form, navigational computation apparatus according to the present invention; and FIG. 6 illustrates some of the apparatus of FIG. 5 in more detail.

Figure 1:
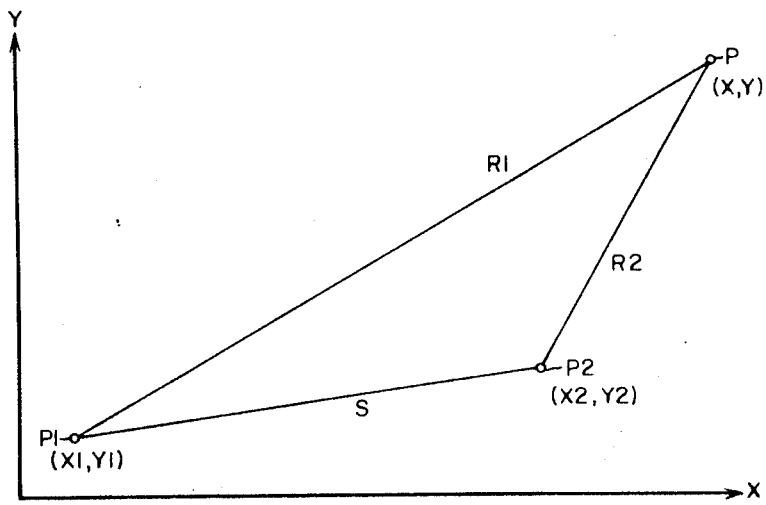
FIGURE 1 illustrates a coordinate diagram to aid in an understanding of the equations developed herein.

Referring now to FIG. 1, there is illustrated, in an X, Y coordinate system, a hypothetical navigational situation wherein P represents a navigational position and has the coordinates X, Y and P1 and P2 represent two spaced points separated by a known distance S and having the coordinates X1, Y1 and X2, Y2, respectively. The range from point P to P1 is R1 and the range from point P to P2 is R2. From FIG. 1 the following equations may be derived:

$$R1^2 = (X-X1)^2 + (Y-Y1)^2 \qquad (1)$$
$$R2^2 = (X-X2)^2 + (Y-Y2)^2 \qquad (2)$$

Subtracting Equation 2 from Equation 1 and solving for Y:

$$Y = \frac{X2-X1}{Y2-Y1}(X) + \frac{R1^2-R2^2)+[(Y2^2-Y1^2)+(X2^2-X1^2)]}{2(Y2-Y1)} \quad (3)$$

Equation 3 is of the well known form $Y=MX+B$ and describes a family of parallel straight lines each having the same slope $$-\frac{X2-X1}{Y2-Y1}$$

Equation 3 may be simplified by reorienting the diagram of FIG. 1 such that point P1 is placed at the origin and the line joining P1 and P2 is placed along the Y axis so that $X1=0$, $Y1=0$, $X2=0$ and $Y2=S$, the length of the line joining P1 and P2. Equation 3 then reduces to:

$$Y = \frac{(R1^2-R2^2)+S^2}{2S} \quad (4)$$

Dividing both sides of Equation 4 by S:

$$\frac{Y}{S} = \frac{R1^2-R2^2}{2S^2} + \frac{1}{2} \quad (5)$$

In Equation 5, $Y/S$ is a contour parameter and Equation 5 describes a family of parallel planes perpendicular to the line joining the spaced points P1 and P2. Indicative of the contour parameter $Y/S$ is the expression in Equation 5, $$R1^2-R2^2/S^2$$

the remaining terms being constant, and for a particular value of contour parameter or alternatively for particular value of the expression $$R1^2-R2^2/S^2$$

indicative of the contour parameter, point P is located in a particular plane perpendicular to the base line and corresponding to a particular $Y/S$ value. Such a situation may be seen in more detail in FIG. 2 to which reference is now made.

Figure 2:
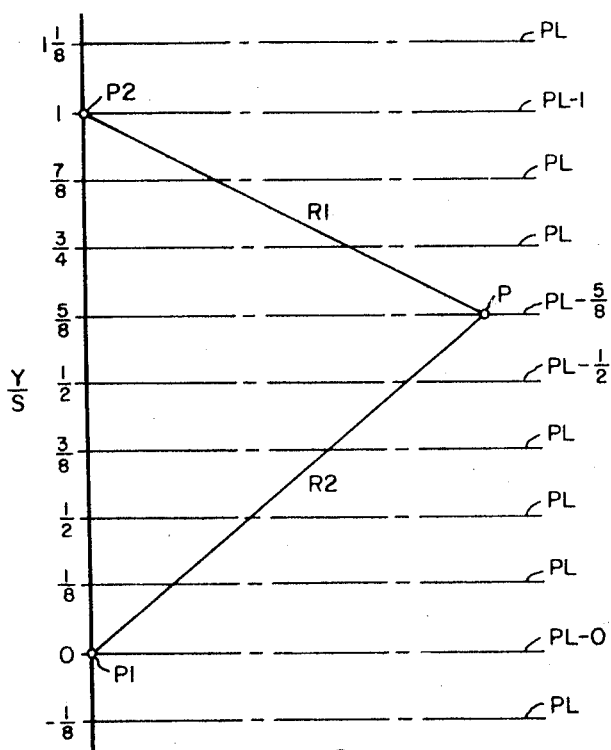
FIG. 2 illustrates a loci diagram in accordance with the equations developed herein.

FIG. 2 illustrates a graphic navigational situation wherein points P1 and P2 represent the spaced points separated by the known distance S, which distance has been normalized; that is, the distance on the vertical scale from P1 to P2 has been made equal to unity. The vertical scale represents the value of the contour parameter $Y/S$. The horizontal lines represent the edge view of a family of parallel planes each perpendicular to the base line and each having a particular constant value of contour parameter $Y/S$. By way of example the plane passing through point P2 and designated PL-1 has a $Y/S$ value of 1 whereas the plane designated PL-0 passing through point P1 has the $Y/S$ value of zero. A plane midway between points P1 and P2 will have a $Y/S$ value of ½, again remembering that the distance from P1 to P2 is equal to unity. Point P represents a navigational position having a range R1 from point P2 and a range R2 from point P1, and lying in the plane PL-⅝ the contour parameter of which is equal to ⅝. It is to be noted that the contour parameter values are relative values and not absolute values and accordingly the contour parameter planes may be defined by other predetermined constant numbers. For example, if in FIG. 2 the mid-point between P1 and P2 were arbitrarily chosen to be zero, P2 could be given the value of +1 and P1 the value of −1 with relative values intermediate the given values. A further description of the situation of FIG. 2 is illustrated in FIG. 3.

Figure 3:
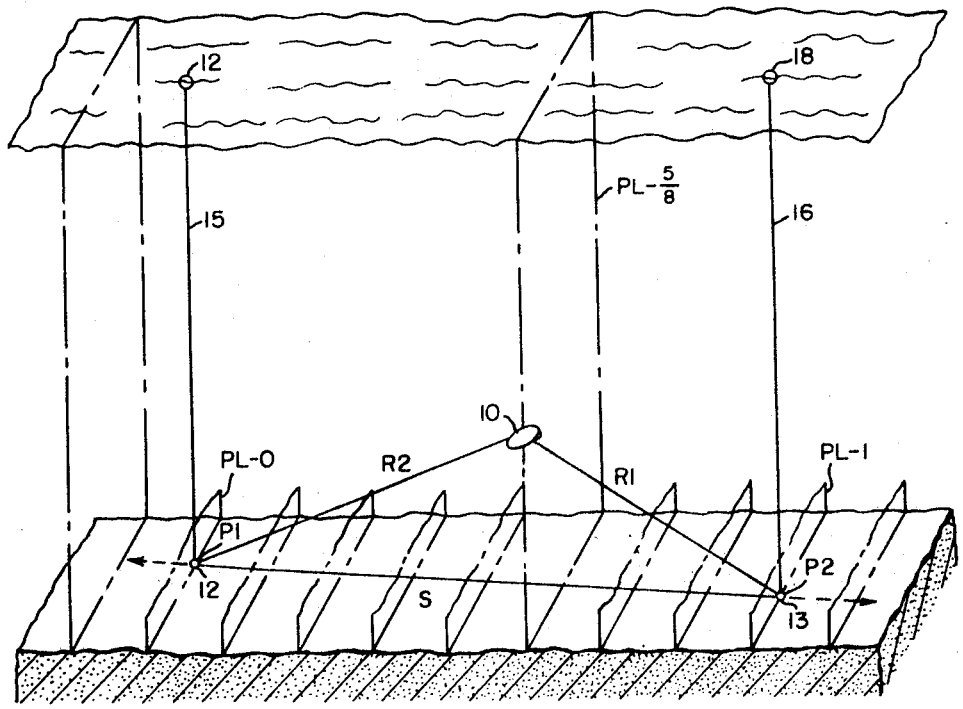
FIG. 3 illustrates an underwater actual application of the loci diagram of FIG. 2.

FIG. 3 depicts an actual situation as graphically depicted in FIG. 2, and by way of example relates to an underwater situation involving an underwater vehicle 10.

The spaced points P1 and P2 separated by a known distance S may be marked and defined by means of for example transponders 12 and 13 which are connected by cables 15 and 16 to surface buoys 17 and 18. The transponder is a device which upon the receipt of acoustic energy such as a sonar signal will retransmit a sonar signal at a certain predetermined frequency. In order that the vehicle 10 know from which transponder it is receiving a signal, the transponders 12 and 13 may be designed to transmit at different frequencies $f1$ and $f2$, respectively.

The plane PL-⅝ in which the vehicle 10 is traveling has been illustrated, and for clarity the remaining planes of the family of planes between P1 and P2 are only partially shown. The navigational apparatus of the present invention serves to maintain the vehicle 10 in a predetermined desired contour parameter plane. However, before the detailed discussion of this operation reference should be made to FIG. 4.

In FIG. 3 there is illustrated the situation wherein a family of parallel planes is associated with the base line joining two spaced points. This concept may be extended to include a plurality of spaced points forming different and intersecting base lines thereby resulting in intersecting contour planes. In FIG. 4 a third transponder 20 may be provided forming a base line with transponder 13. A few of the resulting contour planes are partially shown and with such a grid system a navigational point may be accurately determined (the larger size intersecting planes and the several plane portions have been shown as solids to avoid the confusion of many intersecting lines).

FIG. 5 illustrates in block diagram form, an embodiment of the invention whereby the navigational position of a vehicle may be accurately maintained along a predetermined navigational course in the contour parameter planes. Means are provided for initiating a sequence of predetermined operations and includes timing counter 24, which provides timing pulses to the timing decode section 26. The timing decode section 26 may be a well known type of diode matrix and operates in response to sequential input timing signals to provide output instructions in the form of sequential multi-bit binary words. The instruction register 29 receives each multi-bit binary word to, in turn, provide an operating instruction to the instruction decode 31 which in a well known manner provides the necessary control signals to the remainder of the apparatus.

In order to modify the predetermined sequence of operations such as for example by skipping several operations, there is provided a modifying register 33 which in response to certain conditions will alter the number provided by the timing counter 24 and at a later point in time may be operable to return the timing counter to the number just prior to the modification.

The arrangement whereby the instruction decode 31 provides the necessary control signals as a result of the timing signals eliminates the need for a memory core storage or the like wherein a computer type program must be initially stored.

It has been stated with respect to FIGS. 2 and 3 that the particular value for the contour parameter $Y/S$ is a function of the square of the ranges R1 and R2 and the square of the distance S separating the spaced points P1 and P2, in accordance with the general equation:

$$\frac{Y}{S} = \frac{R1^2-R2^2}{2S^2} + \frac{1}{2}$$

Since the "½" and "2" terms are constants they may or may not be entered into the calculation for the contour parameter. Taking into account the $2S^2$ term, since the distance S is known this constant ($2S^2$) may be stored in the constant register 35 for use in each computation of the contour parameter. Once the ranges R1 and R2 have been obtained, as will be discussed subsequently, the arithmetic unit 37 is operable to obtain the difference of the square of the ranges and divide by the constant term (or multiply by $\frac{1}{2}S^2$ where the value $\frac{1}{2}S^2$ may be stored in the constant register 35).

Means in the form of data store 40 are provided in order to store arithmetic results as well as certain values such as the ranges R1 and R2 when obtained. In the present navigation apparatus the data store 40 may be a plurality of shift registers which in conjunction with the B register 42 is operable to receive data and output data thereby eliminating the need for conventional word addressing circuitry.

In order to obtain an indication of the contour parameter $Y/S$ it is necessary to know the values for the ranges from the vehicle to the known spaced points since it will be remembered, $Y/S$ is dependent upon $$R1^2 - R2^2/S^2$$

This may be accomplished by the provision of transmitter 45 which upon a signal initially provided by the instruction decode unit 31 will transmit an acoustic signal to the previously located transponders such as 12, 13 and 20 of FIG. 4. Upon receipt of the acoustic energy from the transmitter 45 the transponders will retransmit an individually characteristic identifying acoustic signal and receiver means 47 is provided to detect the signals from the transponders.

By way of example the in-coming signals may be of different frequencies and since they do not necessarily occur at the same time but are range dependent, there is provided a receiver control means 50 which is operable to separate the in-coming signals and provide range signals which are indications of the time occurrence of the signal from the respective transponders. Since the receiver control means 50 provides range signals the time occurrence of which is indicative of range, means must be provided in order to obtain an indication of the actual range from the vehicle to a particular transponder. To accomplish this, a range counter 52 is provided and is under the control of the instruction decode unit 31 to start providing a running count when the transmitter 45 is energized. When a particular range signal is provided by the receiver control means 50 the particular count in the range counter 52 at that time is transferred to the data store 40 through the B register 42 and is indicative of the actual range from the vehicle to that particular transponder providing the range signal. In the example given three transponders are utilized and each time occurrence of a range signal effects a transfer of the count in the range counter 52 to the storage. This is accomplished by the provision of the selection gating means 54 which in response to signals from the selection gate scanner 55 is operable to examine the receiver control means 50 to see if any range signals have been provided. This operation is illustrated in more detail in FIG. 6.

As was stated, the receiver 47 receives the signals transmitted by the transponders with each signal having a respective frequency $f1$, $f2$ and $f3$. A filter bank 58 is responsive to the output signal provided by the receiver to separate the frequencies to provide individual frequency signals on the separate leads labeled $f1$, $f2$ and $f3$. The frequency signals are fed to respective flip-flops 60, 61 and 62 each of which is operable in a set and reset state of operation to provide, in its set state of operation, an output signal indicating that a frequency signal has been received. The output signals from the respective flip-flops 60, 61 and 62 may therefore be analogized to the range signals since the time occurrence (measured from the time the transmitter initially transmits) of the output signal of any flip-flop is indicative of range. In other words the time at which a flip-flop provides an output signal is dependent upon the time it takes for acoustic energy to travel from the vehicle to a transponder and back to the vehicle.

The selection gating means 54 includes a plurality of AND gates 67, 68 and 69 each operable to receive the output signal from a respective flip-flop 60, 61 and 62 in addition to an enabling or scanning signal from the selection gate scanner 55. The selection gate scanner 55 is operable in a well known manner to individually and sequentially enable the AND gates, that is, an enabling signal is first provided to AND gate 67 and then to AND gate 68 and lastly to AND gate 69 in a manner that only one AND gate at a time is enabled.

An OR gate 71 is operable in response to a signal from any one of the AND gates 67, 68 or 69 to provide an enabling signal to a bank of AND gates 73 to effect the transfer of the information in the range counter 52 to data storage. By way of example and with additional reference to FIG. 5, the instruction decode unit 31 supplies a signal to the transmitter 45 and at the same time starts the range counter 52. By way of further example suppose that the transponders transmit their signals back to the receiver 47 such that $f1$ is received first, $f2$ is received second and $f3$ is received last. The $f1$ signal triggers flip-flop 60 to its set state of operation thereby providing an output signal to AND gate 67 which upon receipt of an enabling signal from the selection gate scanner 55 provides an output signal which is passed through OR gates 71 to enable the bank of AND gate 73. The range counter 52 may be of the common variety which includes a plurality of flip-flop devices each having an output lead connected to a respective AND gate in the bank of AND gates 73 so that the number in the range counter 52 is transferred to the data store 40 through the B register 42 as a result of the range signal provided by the flip-flop 60. At this time the counter remains in its counting mode and continues to count. When the second frequency signal $f2$ is received, flip-flop 61 is switched to its set state of operation providing an output signal to AND gate 68 which, when provided with an enabling signal from the selection gate scanner 55 produces an enabling signal to the bank of AND gates 73, through OR gate 71, to effect another transfer of the particular count in the range counter 52. By a similar operation the frequency signal $f3$ sets the flip-flop 62, and a third transfer of the count in the range counter 52 is effected.

In order to identify which transponder is associated with a particular range count, the output of the selection gate scanner 55 is also fed to the B register 42 and then to the data store 40 so that when a particular AND gate 67, 68 or 69 is enabled and a transfer takes place the count transferred can be identified with a particular frequency, and accordingly with a particular transponder.

At the completion of the last transfer or before the start of the next operational cycle the flip-flops may be placed into their reset condition by a signal from the instruction decode unit 31.

An example was given wherein the frequency signals $f1$, $f2$ and $f3$ arrived sequentially and in the order named. In some situations two frequency signals or even all frequency signals might arrive simultaneously. In order to be prepared for such a situation, the frequency of the selection gate scanner 55 is made high enough so that all three AND gates 67, 68 and 69 are scanned at a much higher rate than the frequency of the range counter.

Referring now back to FIG. 5, since the frequency of the range counter is known, and the speed of sound in water is known, each count of the counter represents a certain distance and the count or counts transferred from the range counter 52 to the data store 40 are indicative of the range of the vehicle to the respective transponders. The range information is transferred from the data store 40 through the B register 42 to the arithmetic unit 37 where each individual range is squared and returned to storage. Thereafter, the contour parameter $Y/S$ or its equivalent is calculated in the arithmetic unit by subtracting the square of the ranges and performing an arithmetic operation with the number in the constant store 35. The result is then fed to an indicating means such as readout means 76 which may be a meter for viewing by an operator.

Depending upon the number of transponders utilized, a number of readouts may be utilized each one respectively providing a contour parameter value associated with different pairs of spaced points. The operator of the vehicle may then proceed along a predetermined navigational course within a particular contour plane by maintaining the vehicle in a navigational mode such that the readout is maintained at a predetermined constant value associated with that particular contour plane as previously explained.

The apparatus thus far described utilizes conventional circuitry and with the elimination of conventional preprogrammed memories and memory addressing circuitry results in a system which is relatively compact and relatively inexpensive. The system may be extended to include means for automatically controlling the vehicle. To this end there may be provided a storage and conversion unit 78 which in response to the results of certain computations by the arithmetic unit 37 is operable to provide control signals to the propulsion control unit 80. When operating in an automatic mode the arithmetic unit 37 is additionally operable to receive various data from the data input unit 82 which in addition to being operable to provide manually inserted data, may further provide data with respect to navigational orientation, time, water velocity, depth information, water temperature, salinity and density, to name a few.

The apparatus and the method described herein lend themselves not only to military operations but to scientific exploration, search and rescue procedures and commercial operations such as salvage and oil well production facilities. The apparatus allows a vehicle, in one mode of operation, to criss-cross a predetermined base line in each plane of a family of contour planes and with associated equipment such as side looking sonar, an accurate picture of an area in question may be obtained.

The method and apparatus herein lend themselves to other uses; for example, instead of a horizontal base line a vertical base line may be utilized to establish a family of horizontal contour planes whereby underwater vehicles may be "stacked," or in an above surface situation the concept can be extended to the stacking of airplanes where a first point may be established on the ground and a second point may be established far above ground and wherein ranges may be obtained by means of radar.

It is evident that although the present invention has been described with a certain degree of particularity, various and numerous other modifications may be resorted to without departing from the spirit and scope of the invention.

What is claimed is:

1. A method of maintaining a navigational course of a vehicle with respect to two spaced apart points R1 and R2, separated by a distance S, each point having an energy returning device positioned thereat, comprising the steps of:
   (A) transmitting energy from said vehicle to said points;
   (B) initiating a counter means to commence its counting function;
   (C) transferring the count in the counter means to a computer means, in response to receipt at said vehicle of return energy from said points, for calculation of the contour parameter $Y/S$ where $Y$ is a coordinate position and $Y/S$ is dependent upon
   $$\frac{R1^2 - R2^2}{S^2}$$
   the counts in the counter means upon transfer being indicative of R1 and R2; and
   (D) maintaining a navigational course with respect to said spaced points so as to maintain said $Y/S$ value at a predetermined constant value.

2. A navigational method according to claim 1 which additionally includes:
   (A) altering the navigational course to obtain other predetermined $Y/S$ values, and where for each predetermined value obtained the navigational course is maintained as in step (D) of claim 1.

3. A navigation system comprising:
   (A) first means for obtaining an indication of the ranges R1 and R2 from a navigational position to first and second spaced points, respectively, said points being separated by a known distance S;
   (B) second means responsive to said indication of said ranges for obtaining first and second range signals;
   (C) counter means operable to provide a running count;
   (D) control means for providing control signals;
   (E) arithmetic means for computing a relative value for the contour parameter $Y/S$ where $Y$ is a coordinate position and $Y/S$ is dependent upon
   $$\frac{R1^2 - R2^2}{S^2}$$
   and defines for various ranges R1 and R2 as a family of parallel planes perpendicular to the line joining said spaced points;
   (F) register means;
   (G) constant storage means for storing an indication of said $S^2$ term;
   (H) data storage means;
   (I) circuit means under control of said control means and operable to transfer the respective count in said counter means to said data storage means via said register means in response to respective ones of said range signals, the respective counts transferred being indicative of the respective actual ranges R1 and R2;
   (J) said control means being operable to transfer the counts indicative of R1 and R2 to said arithmetic means via said register means, and to transfer the contents of said constant storage means to said arithmetic means, for calculation of said contour parameter $Y/S$; and
   (K) indicating means for providing an indication of said $Y/S$ value whereby a navigational course is described in one of said planes as long as said $Y/S$ value is maintained at a first predetermined constant value, and in other planes of said family of planes when said $Y/S$ value is maintained at other predetermined constant values.

4. A navigation system according to claim 3 wherein the control means includes:
   (A) timing counter means for providing timing pulses;
   (B) timing decode means responsive to said timing pulses for providing output instructions in the form of multi-bit binary words;
   (C) an instruction register for storing the output of said timing decode means; and
   (D) instruction decode operatively connected to said instruction register means for providing control signals in response to said stored output.

5. A navigation system comprising:
   (A) first means for obtaining an indication of the ranges R1 and R2 from a navigational position to first and second spaced points, respectively, said points being spaced by a known distance S;
   (B) second means for obtaining a relative value for the contour parameter $Y/S$ where $Y$ is a coordinate position and $Y/S$ is dependent upon
   $$\frac{R1^2 - R2^2}{S^2}$$
   and defines for various ranges R1 and R2 a family of parallel planes perpendicular to the line joining said spaced points;
   (C) said second means including
      (1) third means for obtaining at least first and second range signals, each respectively indicative of the range from said navigational position to said spaced points,
(2) counter means operable to provide a running count,
(3) storage means, and
(4) fourth means for transferring the count in said counter means to said storage means in response to said first range signal and for transferring the count in said counter means to said storage means in response to said second range signal, the count transferred being indicative of the actual ranges R1 and R2 respectively;
(D) transmitter means;
(E) a transponder means at each said spaced point, each transponder being operable to provide an individually characteristic signal in response to a signal from said transmitter means;
(F) said third means including
(1) fifth means responsive to said individually characteristic signals provided by the respective transponders for providing individual range signals upon receipt of said transponder signals;
(G) said individually characteristic signals being individually different frequency signals;
(H) said fifth means including
(1) receiver means responsive to said frequency signals for providing output signals indicative of the frequencies of the transponder signals,
(2) circuit means responsive to the receiver output for separating the individual frequencies contained therein to provide respective output signals, each on a separate output lead, and each corresponding to a respective frequency;
(I) said circuit means including
(1) a filter bank having a plurality of frequency filters for separating onto individual output leads, the different frequencies contained in the receiver output; and
(2) a plurality of flip-flop devices, each operable in a set and reset state of operation and each individually responsive to a signal on a respective one of said output leads for being placed into a set state of operation; and
(J) indicating means for providing an indication of said Y/S value whereby a navigational course is described in one of said planes as long as said Y/S value is maintained at a first predetermined constant value, and in other planes of said family of planes when said Y/S value is maintained at other predetermined constant values.

6. A navigation system comprising:
(A) first means for obtaining an indication of the ranges R1 and R2 from a navigational position to first and second spaced points, respectively, said points being spaced by a known distance S;
(B) second means for obtaining a relative value for the contour parameter Y/S where Y is a coordinate position and Y/S is dependent upon $$\frac{R1^2 - R2^2}{S^2}$$

and defines for various ranges R1 and R2 a family of parallel planes perpendicular to the line joining said spaced points;
(C) said second means including
(1) third means for obtaining at least first and second range signals, each respectively indicative of the range from said navigational position to said spaced points;
(2) counter means operable to provide a running count;
(3) storage means; and
(4) fourth means for transferring the count in said counter means to said storage means in response to said first range signal and for transferring the count in said counter means to said storage means in response to said second range signal, the count transferred being indicative of the actual ranges R1 and R2 respectively;
(D) said fourth means including
(1) a plurality of gating devices;
(2) scanning means operable to individually and sequentially provide an enabling signal to said gating devices;
(3) each said gating device additionally operable to receive a respective one of said range signals, whereby when enabled, its respective range signal is gated to effect the transfer of the count in said counter means; and
(E) indicating means for providing an indication of said Y/S value whereby a navigational course is described in one of said planes as long as said Y/S value is maintained at a first predetermined constant value, and in other planes of said family of planes when said Y/S value is maintained at other predetermined constant values.

7. A navigation system according to claim 6 wherein:
(A) an indication of each enabling signal is additionally provided to the storage means, whereby when a count is transferred, that particular count can be identified with a particular one of the gating devices.

8. A navigation system according to claim 6 wherein:
(A) the frequency of operation of the scanning means is higher than the frequency of the counter to accommodate for simultaneous occurrence of range signals.

References Cited

UNITED STATES PATENTS

| 2,539,616 | 1/1951 | Gehman | 235—150.26 |
| 3,204,237 | 8/1965 | Overcash | 343—108 |
| 3,213,410 | 10/1965 | Hagemann. | |
| 3,280,311 | 10/1966 | Shatto et al. | |
| 3,316,550 | 4/1967 | Prichodjko | 235—150.27 |
| 3,328,565 | 6/1967 | Prichodjko | 235—150.27 |

RODNEY D. BENNETT, Jr., Primary Examiner

J. G. BAXTER, Assistant Examiner

U.S. Cl. X.R.

235—150; 343—6, 108